March 13, 1934.   R. CLASON   1,950,595
GASOLINE GAUGE
Filed March 22, 1928
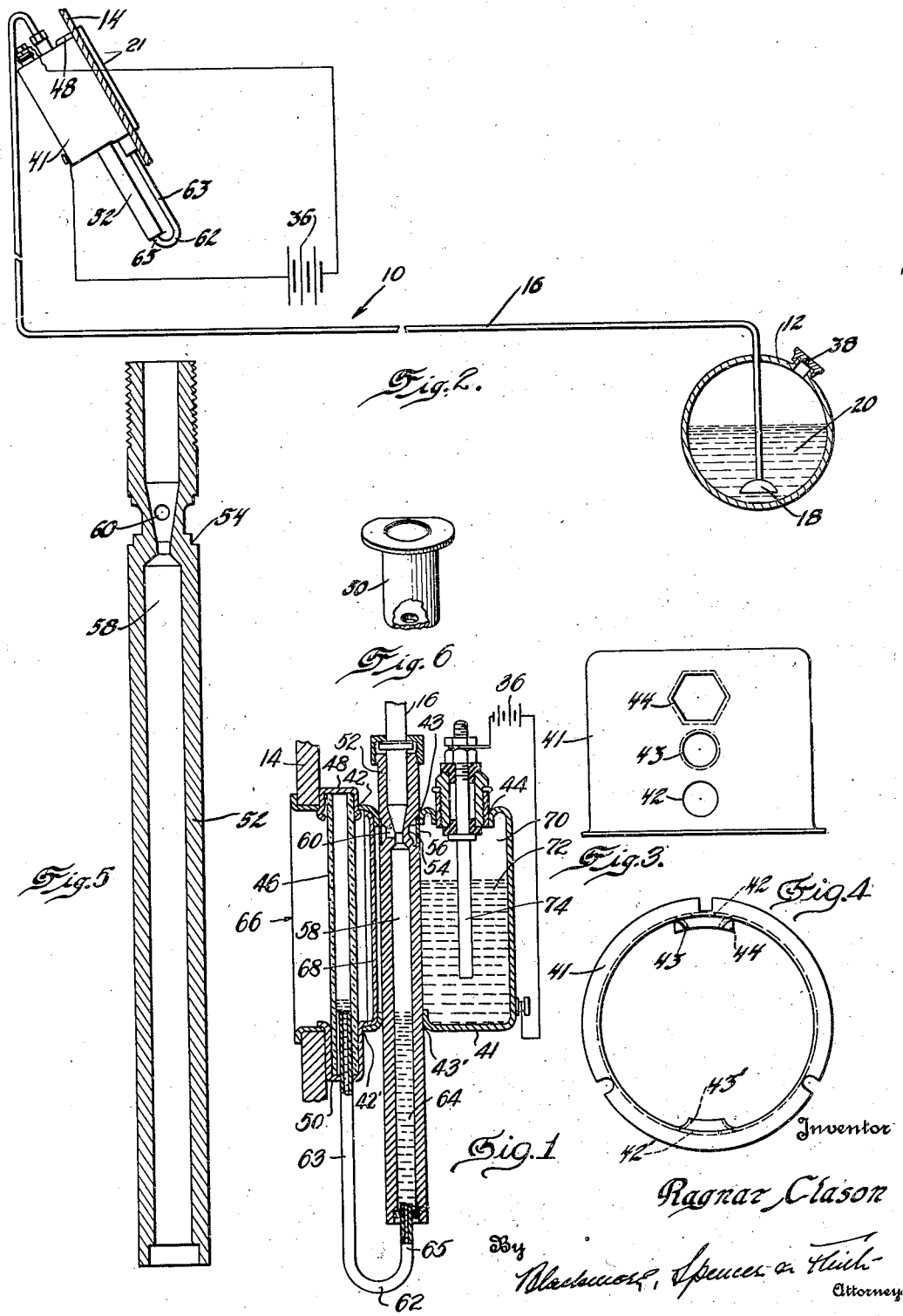

Patented Mar. 13, 1934

1,950,595

UNITED STATES PATENT OFFICE 1,950,595

GASOLINE GAUGE

Ragnar Clason, Flint, Mich., assignor to A C Spark Plug Company, Flint, Mich., a company of Michigan Application March 22, 1928, Serial No. 263,861

2 Claims. (Cl. 73—54)

This invention relates to improvements in liquid level indicators, and has particular reference to the fluid pressure type of indicator used in connection with automotive vehicles, although the indicator is susceptible to variety of applications.

In the past in the fluid type of gauge difficulty has been experienced in maintaining a proper amount of fluid or gas in the indicating system so that an accurate and certain reading would be obtainable at the gauge at all times, and various ways have been devised and employed for the purpose of supplying a gas to the system to compensate for leakage. While the fluid system is supposed to be gas tight and leak proof, as a matter of fact, it has been found in practice that there is some leakage from the system and it is necessary to replace the lost gas. These also may be a diminution in volume of the gas due to temperature contraction or pressure increase.

It is the object of the present invention to build a fluid pressure indicator which will have connected therewith a means for constantly supplying a limited amount of gas, at least slightly in excess of that lost through leakage in the system, and to take care of temperature contraction or pressure increases.

The preferred form of the invention makes use of a specially adapted casing having a plurality of openings and a receptacle formed therein. In one pair of the openings a glass serving as a gauge is held, while through a second pair of openings, a special form of connection forming a part of the liquid level system is passed. The gauge and the connection are interconnected and contain a suitable fluid upon which the gas pressure is exerted, the level of this liquid being read from the front of the gauge. The connection also passes through the receptacle and has a ported bore. The receptacle contains water which is preferably acidulated or otherwise brought to the electrolytic state, and into this water there extends the terminal of an electric circuit. The casing may serve as the second terminal. As the current is turned on it will cause a decomposition of the water into its constituent gases, which will pass through the port to the bore of the connector and thereby supply any gas which may be necessary to the efficient working of the fluid pressure system. The connector is in communication with the automobile gasoline tank or other container the level of the liquid of which it is desired to measure.

In the drawing:

Figure 1 is a sectional view through the gauge and receptacle of the preferred form of the invention.

Figure 2 is a view showing the application of the structure of Figure 1.

Figures 3 and 4 are plan and front views of the casing shown in Figure 1.

Figure 5 is an enlarged sectional view of the connector member per se.

Figure 6 is a perspective view of the cap which secures the gauge glass and tubing to the gauge casing.

Referring to the number parts on the drawing, the numeral 10 indicates the liquid level indicating system as a whole. This system is shown in Figure 2 as applied to the fuel or gasoline tank 12 of an automotive vehicle, the instrument board 14 of which is seen at the left hand side of the figure. The gasoline tank 12 and instrument board 14 are connected by the gas filled pipe or conduit 16 which extends to the bottom of the gasoline tank and has a bell shaped end 18. The bell 18 is open at its bottom to permit the liquid 20 in the tank 12 to exert its pressure on the gas in the pipe 16. This pressure will be transmitted by the gas or air column in the pipe to a liquid in the gauge 21, shown at the dash 14, the height of this liquid indicating the level in the tank.

A certain amount of leakage occurs from all fluid pressure systems regardless of accuracies of manufacture, and in order to replace this loss of gas from the system, and to compensate for temperature contraction and pressure increase, I make use of the structure of Figure 1.

In Figure 1 there is omitted the automobile fuel tank as well as the greater portion of the pipe 16, this construction being shown in Figure 2.

The structure of Figure 1 comprises the shell portion or casing 41, which is provided with a plurality of openings 42, 42', 43, 43' and 44, of which 42 and 42' and 43 and 43' are diametrically opposite each other, the casing 41 being cylindrical in outline.

Through the openings 42 and 42' there is passed a graduated glass 46, a cap 48 being provided for its upper end and a suitable collar 50 for its lower end where it passes through the casing. Through the openings 43 and 43' there is passed a special form of connection 52, which forms a part of and is connected to the pipe 16 of the fluid pressure system. The connector 52 is provided with a circular groove 54 surrounded by a baffle or screen 56 and leading from the groove 54 to the bore 58 of the connector 52, is a port or opening 60 which establishes a communication between the interior of the container 41 and the bore 58.

The lower ends of the graduated glass 46 and the connection 52 are interconnected in liquid tight relation by a U-tube 62, having one long arm 63 and a short arm 65. Inclosed within the connector 52 and the U-tube 62 as well as the lower portion of the graduated glass 46 is a liquid 64, preferably colored, upon which the gas exerts its pressure and which will be forced upwardly in the graduated glass, and the reading of which may be obtained from the front 66 of the gauge. This reading will show the level of the liquid in the tank to which the indicator is adapted.

Formed in the rear of the casing 41 by a plate 68 is a gas tight receptacle or closed portion 70. It will be noted that the connector 52 passes through this receptacle at the openings 43 and 43′ which are closed liquid tight. Extending in fluid tight relation through the opening 44 into a liquid 72 within the receptacle 70 is a terminal 74 of an electric circuit, the casing forming the other terminal. The liquid 72 (preferably water) may or may not have added thereto any suitable acid or salt to make an electrolytic solution. As the current flows from the battery 36 through the terminal 74, it will cause a decomposition of the water into its constituent gases which will rise in the liquid and escape into the fluid pressure system through the port 60. The amount of current passing through the liquid is preferably small so that the amount of gas generated will be proportionately small for the reason that the additional gas required by the fluid pressure system is not large or excessive and does not need to be replaced at any rapid rate.

If desired, the positions of the terminal 74 and the connector 52 with respect to the casing 41 may be interchanged.

The construction of Figure 1 is distinctive in that there is conveniently combined at the gauge 21 in a unitary assembly the receptacle which has the liquid, the decomposition of which furnishes the gas to replenish the system. This structure is very compact, eliminates a number of connections and lends itself to a more ready installation and manufacture in that the casing and receptacle are made in one part.

I claim:

1. In a fluid pressure liquid level indicating system, a casing having a plurality of openings and a receptacle containing a liquid, a connection extending through a pair of said openings and through said receptacle, said connection forming a part of said system, a gauge glass extending through another pair of said openings, means connecting said gauge glass and connection, a terminal of an electric circuit extending through another opening into said receptacle to decompose said liquid into a gaseous state, there being a port in said connection to permit said gas to pass into the system.

2. In a gauge for a fluid pressure indicating system, a casing, a receptacle forming a part of said casing and containing a liquid, indicating means on said casing, fluid tight means forming a part of said receptacle and separating said indicating means and receptacle, means in the receptacle for decomposing the liquid, a connection passing through said receptacle, said connection having an opening to permit the decomposed liquid to pass into the system, a baffle over said opening, and means interconnecting said connection and indicating means.

RAGNAR CLASON.